Aug. 4, 1970

E. FRYDMAN 3,522,563

POLARIZED MERCURY-WETTED REED-RELAY

Filed Jan. 2, 1969

INVENTOR
Emanuel Frydman
BY
Watson, Cole, Grindle & Watson
ATTORNEYS

United States Patent Office 3,522,563
Patented Aug. 4, 1970

3,522,563
POLARIZED MERCURY-WETTED REED-RELAY
Emanuel Frydman, London, England, assignor to
Telephone Manufacturing Company Limited
Filed Jan. 2, 1969, Ser. No. 788,425
Claims priority, application Great Britain, Jan. 8, 1968,
1,108/68
Int. Cl. H01h 51/22
U.S. Cl. 335—153                               4 Claims

ABSTRACT OF THE DISCLOSURE

An improved construction of polarized mercury-wetted reed-relay permitting ready linear and rotational adjustment of the polarizing magnet for adjusting of sensitivity and balance or bias.

---

This invention relates to sealed mercury-wetted reed contact relays and more particularly to such relays having balanced changeover contacts.

It is usual to provide a polarising permanent magnet or magnets to increase the sensitivity of a reed relay of the mercury wetted type. In the case of a relay with balanced changeover contact, that is to say a contact having equal operating sensitivities in both directions of operation, it is necessary to adjust the relative field strength of the two fixed contacts to achieve the balance condition. Further, it is necessary to adjust the actual field strength to achieve the specified sensitivity.

In the one form of known relay a single bar magnet is placed across the two fixed-contact leads, generally being soldered to at least one of the leads. In this case, any adjustment for balance is extremely difficult and sensitivity is adjusted by controlled demagnetisation.

In another form of known relay, a separate bar magnet is attached to each contact, and sensitivity and balance are adjusted by selective demagnetisation of the individual magnets. Since the two adjustments are interdependent, the required final adjustment is achieved with some difficulty.

The object of the present invention is to alleviate the above problems by providing means for the ready adjustment of both balance and sensitivity without the need for demagnetization of the permanent magnet.

According to the invention there is provided a polarized reed contact relay of the sealed mercury-wetted type wherein the polarizing magnet is of annular form and being mounted with diametrically opposed pole regions respectively adjacent fixed contact terminals of the sealed reed contact unit of the relay, the mounting of the magnet being such as to permit rotational adjustment of the magnet relative to said fixed terminals.

The various features and advantages of the invention will be apparent from the following description of an exemplary embodiment thereof taken in conjunction with the accompanying drawing in which.

Figure 1:
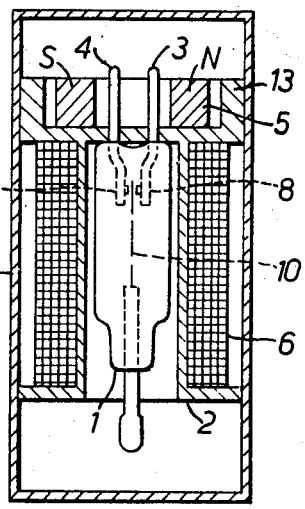
FIG. 1 is a sectional side view of a complete relay according to the invention.

Referring now to FIG. 1, a sealed mercury-wetted reed insert 1 is housed in the core of a moulded bobbin former 2. Two fixed-contact terminals 3, 4 of the insert 1 are arranged to be adjacent to two poles of a ring magnet 5. A coil 6 is wound on the bobbin former 2 and a magnet screen 7 surrounds the assembly.

The two poles N and S of the magnet 5 polarise the fixed contacts 8 and 9 of the insert 1 north and south respectively. The moving reed contact 10 of of the insert is of magnetic material and, when the coil 6 is energised, the tunnel flux magnetises the free end of the reed 10, lying between the two contacts 8, 9, either to a north pole or a south pole. If a south pole results, then the reed is attracted to the contact 8 which is made north by the polarising magnet 5. If the free end of the reed 10 is now made a north pole by reversing the direction of the flux in the coil 6, the reed moves over to make contact with contact 9 which is made south by the polarizing magnet 5.

It can be seen from the drawing that, if one pole of the magnet is moved closer to its associated contact terminal the other pole will move further away from its associated contact terminal so that the terminal closer to the magnet pole will be more strongly polarized than the other terminal. This principle is used to adjust the balance between the two operating sensitivities.

Figure 2:
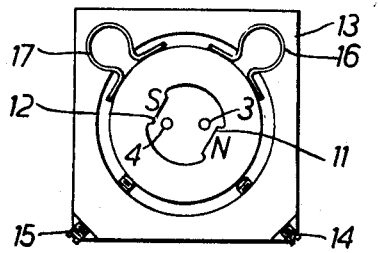
FIG. 2 is a plan view of the magnet and adjusting means.

Referring now to FIG. 2, the ring magnet 5 has two inwardly-projecting flux concentrators 11, 12, which define the north and south polar regions respectively. The magnet 5 is held in a loose-fitting surround 13 and pressed towards two adjusting screws 14, 15, by two omega-shaped springs 16, 17, mounted in suitably shaped cavities in the surround 13. The adjusting screws 14, 15, are held in threaded bores in the surround 13. Thus the magnet 5 can be rotated since it is only held in place by the springs 16, 17. Any tightening of adjusting screws 14 will move poleface 11 towards contact terminal 3 and poleface 12 away from contact terminal 4.

Figure 3:
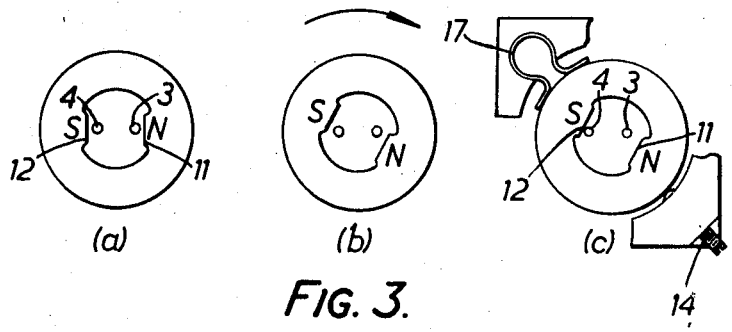
FIG. 3 shows relative positions of the magnet with respect to the contact terminals.

Referring now to FIG. 3(a), with the ring magnet in the position shown with respect to the contact terminals 3 and 4, the maximum possible flux flows in contact terminals 3 and 4 since they are in the strongest part of the field. The magnet strength is such that, in this position, there is a tendency to saturation of the contacts 8 and 9. This will have the effect of reducing the sensitivity. If the magnet were now rotated through a right angle, both contacts would have the same polarity, and the relay will not work. Between these two extremes is a position of maximum sensitivity. Thus, by rotating the magnet as shown in FIG. 3(b) the required sensitivity can be obtained. The magnet strength is so arranged that at the required sensitivity position, the adjustment is fairly coarse.

To adjust for balance of the two operating sensitivities, the adjusting screw 14 is moved forward or backward so that the necessary fluxes are produced in the fixed contacts.

This arrangement also caters for conditions which require a bias, or preferential operation in one direction.

FIG. 3(c) shows a state of adjustment in which the pole face 12 is closer to contact terminal 4 than poleface 13 is to contact 3. Under normal circumstances, in order to obtain balance, there is only a slight difference between the two poleface-to-terminal gaps. In the example shown in FIG. 3(c), the difference is so large that the relay becomes one side stable instead of balanced (i.e., both side stable), in that the moving reed contact always returns to the same side on removal of the energising current. Thus the invention is suitable for both types of relay.

It will be apparent that a wide variety of adjustment can be achieved with the above described arrangement in a very simple manner without the need for external demagnetising means.

A further advantage is that the relay can readily be readjusted "in the field" without the need for complex equipment.

With polarized reed relays, the adjustment setting of the relay is affected by the cover and removal of the cover alters the balance, the sensitivity, or both. For this reason, inter alia, all hitherto known polarised reed relays are sealed and further adjustment in the field is not catered for. In the arrangement described a hole or holes in the screening can 7 enables rotation of the magnet to be made from outside the can, and since the heads of the screws 14, 15 are accessible from the outside of the can, all possible adjustments can be effected without removing the screening can.

I claim:

1. A polarized reed contact relay of the sealed mercury-wetted type wherein the polarizing magnet is of annular form and being mounted with diametrically opposed pole regions respectively adjacent fixed contact terminals of the sealed reed contact unit of the relay, the mounting of the magnet being such as to permit both linear and rotational adjustment of the magnet relative to said fixed terminals.

2. A relay as claimed in claim 1 wherein the magnet is mounted in an annular housing which extends around said fixed contact terminals and is located in position within said housing by a plurality of spacing means acting between the outer cylindrical face of the magnet and the confronting inner face of the housing at least one of said spacing means being resilient and at least one other being adjustable in effective length radially of said housing.

3. A relay as claimed in claim 1 wherein the magnet is mounted in an annular housing which extends around said fixed contact terminals and is located in position within said housing by a plurality of spacing means acting between the outer cylindrical face of the magnet and the confronting inner face of the housing at least one of said spacing means being resilient and at least one other being adjustable in effective length radially of said housing, and at least one of said adjustable spacing means being a screw which is accessible for adjustment from the exterior of said relay.

4. A relay as claimed in claim 2 wherein said magnet, unit and housing are mounted in a magnet screen and having an aperture arranged to give access to said magnet from outside the relay to permit rotation of the magnet within said housing.

References Cited

UNITED STATES PATENTS 2,609,464 9/1952 Brown et al. _____ 335—57 X
3,214,533 10/1965 Scata _____ 335—153

BERNARD A. GILHEANY, Primary Examiner

R. N. ENVALL, Jr., Assistant Examiner

U.S. Cl. X.R.

335—86